(12) United States Patent
Abe et al.

(10) Patent No.: US 6,869,573 B2
(45) Date of Patent: *Mar. 22, 2005

(54) HEATER AND CATALYTIC CONVERTER

(75) Inventors: Fumio Abe, Handa (JP); Keiji Noda, Nagoya (JP)

(73) Assignee: NGK Insulators, Ltd. (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/857,585

(22) Filed: May 16, 1997

(65) Prior Publication Data

US 2003/0125194 A1 Jul. 3, 2003

Related U.S. Application Data

(63) Continuation of application No. 08/530,537, filed on Sep. 20, 1995, now abandoned, which is a continuation of application No. 08/067,275, filed on May 26, 1993, now abandoned, which is a continuation-in-part of application No. 07/765,059, filed on Sep. 24, 1991, now Pat. No. 5,296,198.

(30) Foreign Application Priority Data

Nov. 9, 1990 (JP) ............................................. 2-305430
Nov. 9, 1990 (JP) ............................................. 2-305431

(51) Int. Cl.$^7$ ............................................. B01D 53/34
(52) U.S. Cl. ..................... 422/180; 422/171; 422/177; 502/66; 502/326
(58) Field of Search ..................... 502/66, 71, 232, 502/415, 407, 326, 327, 350, 351; 423/439.2; 422/177, 180, 171

(56) References Cited

U.S. PATENT DOCUMENTS

| | | | |
|---|---|---|---|
| 3,591,488 A | * 7/1971 | Eberly, Jr. et al. | 208/111 |
| 3,768,982 A | 10/1973 | Kitzner et al. | 422/174 |
| 3,770,389 A | 11/1973 | Kitzner et al. | 422/180 |
| 4,645,751 A | 2/1987 | McCullen et al. | 502/37 |
| 4,976,929 A | 12/1990 | Cornelison et al. | 422/174 |
| 5,063,029 A | 11/1991 | Mizuno et al. | 422/175 |
| 5,164,350 A | * 11/1992 | Abe et al. | 502/66 |
| 5,164,351 A | 11/1992 | Steinbach et al. | 502/74 |
| 5,165,224 A | 11/1992 | Spadaccini et al. | 60/39.02 |
| 5,168,085 A | * 12/1992 | Addiego et al. | 502/66 |
| 5,169,814 A | 12/1992 | Yoshimoto et al. | 502/74 |
| 5,223,236 A | * 6/1993 | Inoue et al. | 423/213.2 |
| 5,292,696 A | * 3/1994 | Ito et al. | 502/71 |
| 5,447,694 A | * 9/1995 | Swaroop et al. | 422/171 |

FOREIGN PATENT DOCUMENTS

| | | | |
|---|---|---|---|
| EP | 0002791 | 7/1979 | ............ F01N/3/15 |
| EP | 0015132 | 9/1980 | ........... C01B/33/28 |
| EP | 0396085 | 11/1990 | .......... B01J/27/185 |
| FR | 1363723 | 5/1964 | |
| JP | 63-67609 | 5/1988 | |
| JP | 89-197061 | * 5/1989 | ................. 502/66 |
| JP | 2-56247 | * 2/1990 | |
| JP | HEI 2-56247 | * 2/1990 | |
| JP | 2-75327 | 3/1990 | |
| JP | 2-126937 | 5/1990 | |
| JP | 2-135126 | 5/1990 | |
| JP | 2-173312 | 7/1990 | |
| JP | 2261546 | * 10/1990 | .............. 423/239.2 |
| JP | 4018916 | * 1/1992 | .............. 423/239.2 |
| WO | WO 89/10471 | 11/1989 | |

OTHER PUBLICATIONS

Chemical Abstracts (113:102645 CA), "Catalyst for Automobile exhaust gas treatment", Inventors: Masataka et al., Feb. 26, 1990.*
Patent Abstracts of Japan, vol. 13, No. 42 (C–564), Jan. 30, 1989; & JP–A–63 240 951 (Babcock Hitachi) o–10–1988.
Patent Abstracts of Japan, vol. 14, No. 370 (C–747) [4313], Aug. 10, 1990; & JP–A–2 135 126 (TOYOTA) May 24, 1990.
Patent Abstracts of Japan, vol. 13, No. 394 (C–631), Aug. 31, 1989; & JP–A–139 145 (TOYOTA) May 30, 1989.
Patent Abstracts of Japan, vol. 13, No. 516 (C–656), Nov. 17, 1989; & JP–A–1 210 018 (MATSUHITA) Aug. 23, 1989.
Patent Abstracts of Japan, vol. 8, No. 227 (M–332), Oct. 18, 1984; & JP–A–59 109 704 (TOSHIBA).
Patent Abstracts of Japan, vol. 13, No. 395 (C–631) Aug. 31, 1989 & JP–A–01 139 144 (Toyota) May 31, 1989.

* cited by examiner

*Primary Examiner*—Hien Tran
(74) *Attorney, Agent, or Firm*—Parkhurst & Wendel, L.L.P.

(57) ABSTRACT

An adsorbent structure including a honeycomb structure having a periphery and two ends, the honeycomb structure having a plurality of passages which are defined by partition walls and extend in an axial direction between the ends, and a composition including zeolite coated on the partition walls. The zeolite may be a high-silica zeolite having a Si/Al ratio of not less than 40. The composition may include a mixture of zeolite and heat-resistant oxide loaded with a noble metal, and the zeolite may also be loaded with a noble metal. Further, the composition may include two layers, a first layer comprising zeolite, and a second layer comprising a heat-resistant oxide loaded with a noble metal. The first layer comprising zeolite may be loaded with a noble metal.

7 Claims, 2 Drawing Sheets

HEATER AND CATALYTIC CONVERTER

This is a Continuation of application Ser. No. 08/530,537 filed Sep. 20, 1995, now abandoned which in turn is a continuation of Ser. No. 08/067,275 filed May 26, 1993, now abandoned which in turn is a continuation-in-part of Ser. No. 07/765,059 filed Sep. 24, 1991, now U.S. Pat. No. 5,296,198.

BACKGROUND OF THE INVENTION

1. Field of the Invention

The present invention relates to a heater comprising a honeycomb structure, an adsorbent (composed mainly of zeolite) or an adsorbent-catalyst composition coated on the honeycomb structure, the electrodes being fixed to the honeycomb structure. The present invention also relates to a catalytic converter comprising at least one main monolith catalyst and a heater arranged in a particular order; and a catalytic converter comprising a honeycomb heater, at least one main monolith catalyst and a zeolite adsorbent arranged in a particular order.

The above heater can be employed as a heater for domestic use, such as a hot air heater or as an industrial heater, such as a preheater used for control of automobile exhaust gas. The above catalytic converters can be employed for purification of automobile exhaust gas.

2. Description of the Prior Art

Catalytic converters used for purification of automobile exhaust gas or the like must be heated to a certain temperature or higher in order to exhibit their catalytic activities. Accordingly, when they are not sufficiently heated as in the start-up of an automobile, it is necessary to heat them.

A technique for heating a catalytic converter is proposed in Japanese Utility Model Application Laid-Open No. 67609/1988. This document discloses a catalytic converter comprising (a) a ceramic monolith catalyst and (b) an electrically heatable metal monolith catalyst provided upstream of the ceramic monolith catalyst (a) and in close vicinity thereto, consisting of a metal carrier and alumina coated thereon.

Of the harmful compounds (HC's, CO and NOx) present in automobile exhaust gases, particularly HC's (hydrocarbons) produce photochemical smog (oxidant). Accordingly, regulation therefor has been tightened, and proposals have been made to purify the HC's discharged in a large amount at the engine start-up, by utilizing zeolite for its adsorbability. For example, there has been proposed apparatuses for purification of automobile exhaust gas, arranged in the exhaust gas system of an automobile, which comprise (a) a purification catalyst and (b) an adsorbent (e.g., zeolite) or a catalyst-supporting adsorbent provided upstream of the purification catalyst (a) [reference is made to, for example, Japanese Patent Application Laid-Open Nos. 75327/1990, 173312/1990 and 135126/1990].

Further, an adsorbent comprising a metal carrier and zeolite coated thereon is disclosed in Japanese Patent Application Laid-Open No. 126937/1990.

The above proposals, however, each have a problem. The catalytic converter disclosed in Japanese Utility Model Application Laid-Open NO. 67609/1988 consists of a metal monolith catalyst as a preheater and a main monolith catalyst. With this catalytic converter, it is difficult to purify hydrocarbons in exhaust gas, at the start-up of an engine.

With the apparatus for purification of automobile exhaust gas arranged in the exhaust gas system of automobile (disclosed in Japanese Patent Application Laid-Open No. 75327/1990), comprising a purification catalyst and an adsorbent (e.g., zeolite) provided upstream of the purification catalyst, even if HC's are adsorbed by the adsorbent provided upstream of the purification catalyst, the HC's are desorbed from the adsorbent upon the warm-up of the engine. As a result, a considerable amount of untreated (unburnt) HC's pass through the purification catalyst which is not yet heated sufficiently.

Japanese Patent Application Laid-Open No. 173312/1990 discloses a technique utilizing a main exhaust gas passage containing a catalyst and a by-pass passage containing an adsorbent, wherein an exhaust gas is passed through the by-pass passage during the start-up of the engine, using a switching means and, when the temperature of the exhaust gas has reached the working temperature of the catalyst provided in the main passage, the exhaust gas is passed through the catalyst of the main passage using the switching means. With this technique, a complicated mechanism is required to enable the switching from the by-pass passage to the main passage when the catalyst in the main passage has been heated sufficiently. Moreover, a substantial amount of an exhaust gas passes through the catalyst of the main passage without being purified, before the catalyst is heated sufficiently.

In the apparatus for purification of automobile exhaust gas arranged in the exhaust gas system of an automobile (disclosed in Japanese Patent Application Laid-Open No. 135126/1990), comprising a purification catalyst and an adsorbent containing a catalyst supported thereon, provided upstream of the purification catalyst, the start-up of the purification catalyst is delayed because of the heat capacity of the adsorbent. Further, the amount of the catalyst added to the adsorbent is limited and sufficient purification is not possible.

Japanese Patent Application Laid-Open No. 125937/1990 discloses an adsorbent alone and mentions neither heater nor catalytic converter for exhaust gas including CO, HC's and $NO_x$.

Furthermore, a zeolite used as an adsorbent in these references mentioned above is of Y type or mordenite. The zeolite is of poor heat resistance, and it adsorbs water contained in the exhaust gas, resulting in lowering of adsorptive power.

SUMMARY OF THE INVENTION

Objects of the present invention are to solve the above-mentioned problems of the prior art and to provide a heater and catalytic converter.

In order to achieve the above objects, the present invention provides a heater comprising (a) a honeycomb structure having a number of passages, (b) an adsorbent mainly composed of zeolite, or an adsorbent-catalyst composition comprising adsorbent and a catalyst component supported thereon, the adsorbent or composition being coated on the honeycomb structure, and (c) at least two electrodes fixed to the honeycomb structure for electrification thereof, wherein a gas is flowed through the passages in the honeycomb structure and is heated.

The present invention further provides a catalytic converter comprising at least one main monolith catalyst and the above heater provided upstream or downstream of the main monolith catalyst, or between the main monolith catalysts.

The present invention furthermore provides a catalytic converter for purification of automobile exhaust gas, comprising (a) at least one main monolith catalyst, (b) a honeycomb heater comprising a honeycomb structure having a large number of passages and at least two electrodes for electrification fixed to the honeycomb structure and (c) an adsorbent composed mainly of zeolite, each of the at least one main monolith catalyst (a), the honeycomb heater (b) and the adsorbent (c) being provided in the exhaust gas system of an automobile.

In the present invention, the adsorbent composed mainly of zeolite and/or the honeycomb heater may contain a catalyst supported thereon. This is preferable because the adsorbability of zeolite and the catalytic activity of the catalyst act synergistically to provide an improved ability for purification of exhaust gas.

Furthermore, in the present invention, it is also preferable that the honeycomb heater contains an adsorbent mainly composed of zeolite, or an adsorbent-catalyst composition comprising an adsorbent composed mainly of zeolite and a catalyst component supported on the adsorbent.

In the catalytic converter of the present invention, of the at least one main monolith catalyst, the honeycomb heater and the adsorbent, the element having a catalytic activity is provided furthest downstream in the exhaust gas system of an automobile. Except for this restriction, the above three components can be arranged in any desired order.

In the present invention, it is preferable to provide a resistance-adjusting means (e.g., a slit) between the electrodes which are fixed to the honeycomb structure because such means enables rapid heating of the low-temperature exhaust gas generated during engine start-up.

The zeolite is preferably a high-silica zeolite having a Si/Al ration of 40 or more, because such a zeolite has higher heat resistance and relaxes the use conditions for catalyst.

The adsorbent-catalyst composition comprising an adsorbent and a catalyst supported thereon, is preferably a composition comprising (a) a high-silica zeolite having a Si/Al ration of 40 or more, ion-exchanged with at least one noble metal selected from Pt, Pd, Rh, Ir and Ru and (b) a heat-resistant oxide containing at least one noble metal selected from Pt, Pd, Rh, Ir and Ru.

The honeycomb structure is preferably obtained by shaping a raw material powder into a honeycomb form, followed by sintering.

Furthermore, the present invention provides an adsorbent comprising (a) a honeycomb structure having a number of passages and (b) a high-silica zeolite having a Si/Al ratio of 40 or more, coated on the honeycomb structure.

In this case, it is preferable that a catalyst component is supported on the high-silica zeolite.

BRIEF DESCRIPTION OF THE DRAWINGS

FIGS. 1(a) to 1(f) each illustrate a preferable arrangement of the catalytic converter for purification of automobile exhaust gas, of the present invention.

DETAILED DESCRIPTION OF THE INVENTION

The present invention resides in a heater comprising (a) a honeycomb structure, (b) an adsorbent composed mainly of zoolite, or an adsorbent-catalyst composition comprising adsorbent and a catalyst component supported thereon, the adsorbent or adsorbent-catalyst composition being coated on the honeycomb structure, and (c) electrodes fixed to the honeycomb structure for electrification of the honeycomb structure. The present invention also relates to a catalytic converter comprising a heater and at least one main monolith catalyst.

The present invention further resides in a catalytic converter for purification of automobile exhaust gas, comprising (a) a honeycomb heater with may contain a catalyst supported thereon, (b) at least on main monolith catalyst and (c) a zeolite adsorbent which may contain a catalyst supported thereon, the (a), (b) and (c) being arranged in the exhaust gas system of an automobile.

In most of the conventional electrical heaters for purification of automobile exhaust gas (i.e., those which include a honeycomb structure which is not coated with any adsorbent or any adsorbent-catalyst composition), to save power consumption, electricity is passed through the heater for several tens of seconds before start-up of an engine to heat the heater. Further, no electricity is passed during the operation of cell motor, and thereafter, electricity is passed again to heat the heater.

Meanwhile, in the heater of the present invention, since an adsorbent or an adsorbent-catalyst composition is coated on a honeycomb structure, or a zeolite adsorbent is used together with a honeycomb heater and at least one main monolith catalyst, no electricity is passed before the start-up of engine. At the start-up of engine driven by a cell motor, unburnt HC's in low-temperature exhaust gas are captured by the zeolite and thereafter, electricity is passed through the heater to heat the heater. Simultaneously, the HC's captured by zeolite begin to be desorbed, and the main monolith catalyst and/or the catalyst supported on the heater, generally arranged downstream of the zeolite adsorbent, is momentarily heated, whereby the HC's are reacted and purified. When a catalyst is supported on the zeolite adsorbent, the captured HC's are not only desorbed but also reacted and purified.

Incidentally, during the start-up of an engine, the exhaust gas is at a fuel-rich side (an air-lean side). Therefore, it is necessary to introduce into the exhaust gas an oxidizing gas (e.g., secondary air) to oxidize HC's or CO.

FIGS. 1(a) to 1(f) show preferable arrangements of a honeycomb heater 2 (which may contain a catalyst supported thereon), main monolith catalyst(s) 3 and a zeolite adsorbent 1 (which may contain a catalyst supported thereon) constituting the catalytic converter for purification of automobile exhaust gas according to the present invention.

Figures 1A, 1F:
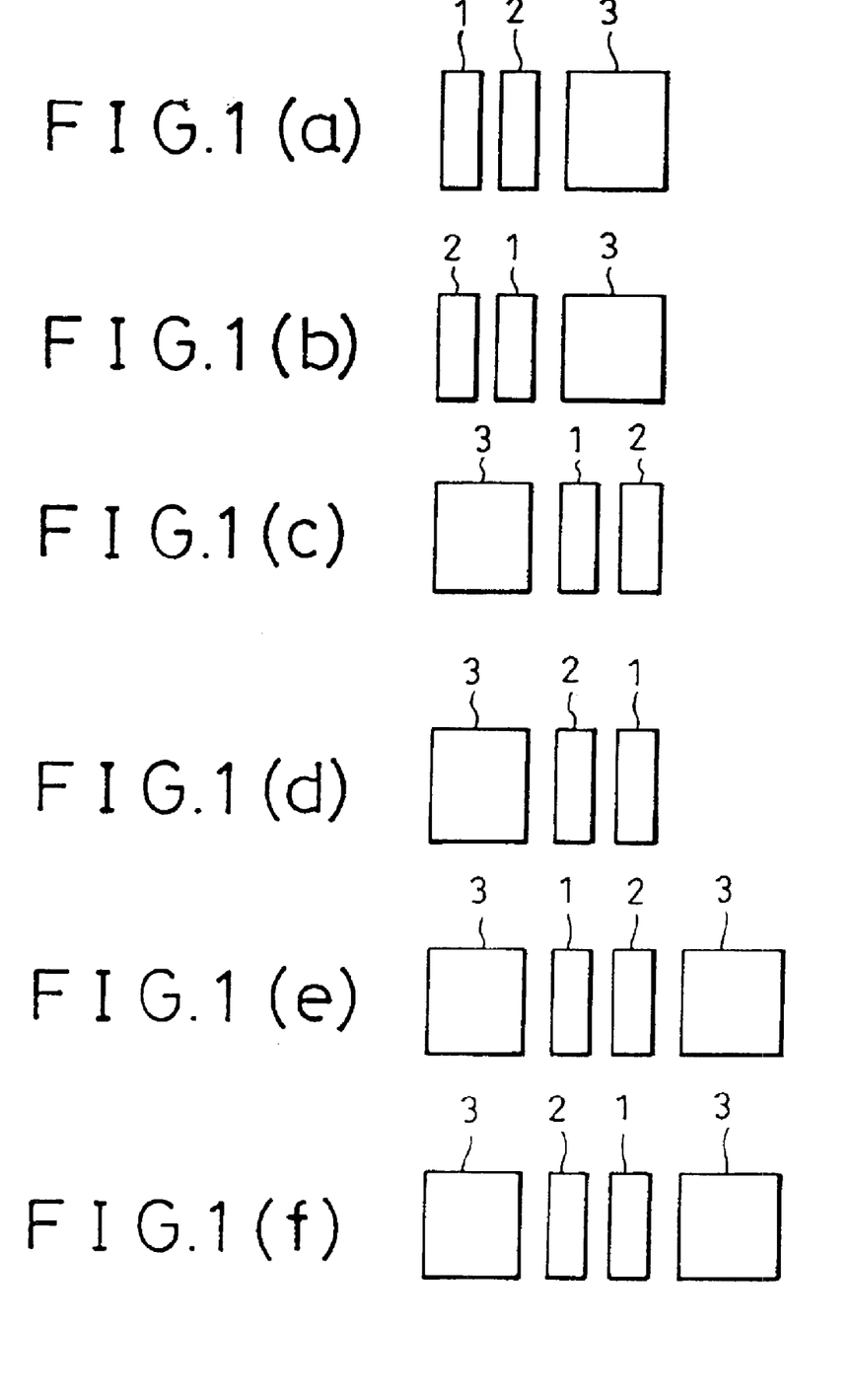

Of these arrangements, the arrangement of FIG. 1(a) wherein the zeolite adsorbent 1 is located furthest upstream in the exhaust gas system of an automobile is preferable, because it can carry out adsorption most easily. In this arrangement, the honeycomb heater 2 and the zeolite adsorbent 1 may or may not contain a catalyst supported thereon.

In the arrangement of FIG. 1(b) wherein the honeycomb heater 2, the zeolite adsorbent 1 and the main monolith catalyst 3 are arranged in this order (the heater 2 is located most upstream), HC's can be controlled easily because the HC's adsorbed by the zeolite adsorbent 1 can be desorbed by the electrification and heating of the heater 2. Also in this embodiment, the honeycomb heater 2 and the zeolite adsorbent 1 may or may not contain a catalyst supported thereon.

The arrangement of FIGS. 1(c) to 1(f) wherein the main monolith catalyst 3 is provided furthest upstream are preferable because the zeolite adsorbent 1 and the catalyst on the heater 2 are resistant to deactivation and have excellent durability. In the arrangements of FIGS. 1(c) and 1(d), the zeolite adsorbent 1 or the honeycomb heater 2 provided intermediately may or may not contain a catalyst supported thereon. However, the honeycomb heater 2 or the zeolite adsorbent 1 provided furthest downstream must contain a catalyst supported thereon.

In the arrangements of FIGS. 1(*e*) and 1(*f*) wherein the zeolite adsorbent 1 and the honeycomb heater 2 are arranged between the main monolith catalysts 3, the zeolite adsorbent 1 and the honeycomb heater 2 may or may not contain a catalyst supported thereon.

The zeolite used as an adsorbent in the present invention has no particular restriction with respect to its type. Preferable adsorbents include Y type zeolite, mordenite and commercially available products such as H-ZSM-5 and ZSM-8 of Mobil and Conteka and Silicalite of UOP. Also, there are preferably used adsorbents obtained by subjecting zeolite such as X type, Y type, mordenite or the like to a dealumination treatment to remove aluminum from the zeolite skeleton and thereby increase the Si/Al ratio. It is referable to use a high-silica zeolite having a Si/Al ratio or 40 or more. When the Si/Al ratio is less than 40, the zeolite has insufficient heat resistance and increased hydrophilicity. As a result, it shows high adsorbability for the water contained in exhaust gas, which is not preferable.

In high silica zeolites, as in the case of well known ordinary zeolite, the minimum unit of the crystal lattices is a crystalline aluminosilicate, and $Al_2O_3$ and $SiO_2$ are continuously bonded via an oxygen ion. These high-silica zeolites have a Si/Al ratio of about 10 or more, as compared with Si/Al ratio of 1–5 of ordinary zeolite. In the present invention, a high-silica zeolite having a Si/Al ratio of particularly 40 or more is preferable as mentioned above. When the Si/Al ratio is more than 1,000, the zeolite has reduced capacity for adsorption and, when a catalyst component is added thereto, only a small amount of noble metal(s) can be introduced into the zeolite by ion exchange because the zeolite has a small number of ion exchange sites. Therefore, such a zeolite is not preferable. The high-silica zeolite used in the present invention is preferably a H (proton) type in view of the heat resistance.

In the present invention, it is preferable that the catalyst supported on the adsorbent composed mainly of zeolite, contain a noble metal such as Pt, Pd, Rh or the like. It is also preferable that a heat-resistant oxide having a high specific surface area be added to the catalyst, in view of excellent light-off performance. A noble metal such as Pt, Pd, Rh or the like is supported on the zeolite and/or the heat-resistant oxide. In this case, the noble metal may be supported on the zeolite by ion exchange, in view of the zeolite's heat resistance and selective $NO_x$ removability [the generation of $NH_3$, a by-product, is suppressed].

In view of the desired catalyst properties as mentioned above, as the adsorbent-catalyst composition comprising an adsorbent and a catalyst supported thereon, which is most appropriate for use in the present invention, there can be mentioned a composition comprising (a) a high-silica zeolite having a Si/Al ratio of 40 or more, ion-exchanged with at least one noble metal selected form Pt, Pd, Rh, Ir and Ru and (b) a heat-resistant oxide containing at least one noble metal selected from Pt, Pd, Rh, Ir and Ru.

The component (a) can be obtained by ion exchanging a high-silica zeolite with at least one noble metal selected from Pt, Pd, Rh, Ir and Ru, in an appropriate aqueous solution. The percent ion exchange of the noble metal is preferably 10–85%, more preferably 30–85% in order to obtain the above mentioned desired properties.

The noble metal introduced into the high-silica zeolite by ion exchange is fixed at the exchange sites of the zeolite in high dispersion and can exhibit effective catalytic activity, is resistant to vaporization, does not cause agglomeration even at high temperatures, and can maintain a high activity over a long period of time.

The zeolite ion exchanged with a noble metal can be prepared, for example, as follows.

A high-silica zeolite is immersed in a solution containing $10^{-4}$ to $10^{-1}$ mol/liter of a cationic metal ion. The system is allowed to stand, is stirred, or is refluxed at room temperature to 100° C., preferably 80–90° C. for about 2 hours or more to subject the zeolite exchange with noble metal ion. If necessary, filtration and water washing are repeated to remove metals other than the ion-exchanged noble metal. After the ion exchange, the resulting zeolite is dried conventionally at 80–150° C., and further, is fired in an oxidizing or reducing atmosphere at 300–1,000° C. for about 1–10 hours, to obtain a zeolite ion-exchanged with a noble metal.

When a rare earth metal oxide (e.g., $CeO_2$, $La_2O_3$) and/or an alkaline earth metal oxide is added to the zeolite, the resulting zeolite has a wider three-way catalytic activity owing to the oxygen storability of the rare earth metal and can find wider applications, and moreover has higher heat resistance owing to the addition of the alkaline earth metal.

As the component (b) which is heat-resistant oxide, there can be used $Al_2O_3$, $TiO_2$, $ZrO_2$ or $SiO_2$, or a compound oxide thereof. Addition of a rare earth metal oxide (e.g., $CeO_2$, $La_2O_3$) and/or an alkaline earth metal oxide to the above heat resistant oxide is preferable because, as mentioned above, the resulting oxide can have a wider three-way catalytic activity and higher heat resistance. The component (b) is formed by allowing the above heat-resistant oxide to support at least one noble metal.

The weight ratio of the component (a) to the component (b) in the adsorbent-catalyst composition is preferably 10:90 to 85:15. When the content of the component (a) is less than 10% by weight, the resulting composition has no selective $NO_x$ removability [the generation of $NH_3$, a by-product, is not suppressed]. When the content of the component (a) is more than 85% by weight, the resulting composition has poor light-off performance.

In the adsorbent-catalyst composition of the present invention, the total amount of noble metal loaded is preferably 10–35 $g/ft^3$, more preferably 15–30 $g/ft^3$. When the total amount of noble metals loaded is less than 10 $g/ft^3$, there are problems in light-off performance and durability. When the amount is more than 35 $g/ft^3$, a high cost is incurred. In the conventional catalysts for exhaust gas purification, it has been necessary to load Rh in an amount of at least 5 $g/ft^3$. Meanwhile, in the catalyst of the present invention using a high-silica zeolite having a Si/Al ratio of 40 or more, Rh loading in an amount of less than 5 $g/ft^3$ can sufficiently perform selective reduction of $NO_x$ to $N_2$, and further, the loading even in an amount of 0–2 $g/ft^3$ can exhibit practically sufficient selectivity when the resulting catalyst is used under relatively mild conditions (e.g., low use temperature and low content of poisoning material in exhaust gas).

As shown in FIGS. 1(*a*) to 1(*f*), a catalytic converter includes zeolite adsorbent 1, honeycomb heater 2, and main monolith catalysts 3 arranged in the exhaust system. During a constant state (after warm-up) the main monolith catalysts 3 principally purify the exhaust gas through its catalytic activity.

The adsorbent-catalyst composition does not necessarily include a noble metal in the component (a), and high-silica zeolite does not necessarily undergo ion-exchange with noble metal. Thus, the adsorbent-catalyst composition may include a high-silica zeolite having a Si/Al ratio of not less than 40 and a heat resistant oxide containing at least one noble metal selected from Pt, Pd, Rh, Ir, and Ru. In this case, a lesser amount of the noble metal is required. Whether high-silica zeolite is ion-exchanged with a noble metal or not, the component (a) and the component (b) may disperse and mix with each other substantially uniformly. Alternatively each of components (a) and (b) may be present as separate layers on a honeycomb structure.

In the latter case, preferably the component (a) is coated on a honeycomb structure as the first layer, and the second layer including the component (b) is coated on the first layer. Hydrocarbons emitted during engine warm-up diffuse through the second layer and are then trapped in the first layer including the high-silica zeolite. As the exhaust gas warms up, the noble metal of the component (b) in the second layer is activated, and upon elimination of the trapped hydrocarbon from the first layer, the hydrocarbons are converted by the second layer.

The honeycomb structure is used in the present invention is preferably produced by shaping a raw material powder into a honeycomb form, followed by sintering. In this case, so-called powder metallurgy and extrusion molding are preferably used in view of the simple process and the low cost.

The heater or the catalytic converter used in the present invention is preferably produced in the form of a honeycomb structure (a one-piece structure) using a raw material powder, because such a structure generates no telescope phenomenon and enables uniform heating.

In the heater or the honeycomb heater used in the present invention, it is preferable to use a metallic honeycomb structure whose surfaces or partition walls and pores have been coated with a heat-resistant metal oxide such as $Al_2O_3$, $Cr_2O_3$ or the like, because the use of such a honeycomb structure has increased heat resistance, oxidation resistance and corrosion resistance.

The honeycomb structure may be made of any material as long as the material can generate heat when electrified, and may be a metal or a ceramic. However, a metal is preferable as the material for the honeycomb structure, because of the high mechanical strength. Examples of such a metal include stainless steel and those having compositions of Fe—Cr—Al, Fe—Cr, Fe—Al, Fe—Ni, W—Co and Ni—Cr. Among the above materials, Fe—Cr—Al, Fe—Cr and Fe—Al are preferred because of the low cost and high resistance to heat, oxidation and corrosion. A metallic honeycomb structure or foil type may also be employed.

The honeycomb structure employed in the present invention may be porous or non-porous. However, in the case where the honeycomb structure loads thereon a catalyst, an adsorbent composed mainly of zeolite, or an adsorbent-catalyst composition comprising the adsorbent and a catalyst supported thereon, a porous honeycomb structure is preferred because it has high adhesion to the catalyst, the adsorbent or the adsorbent-catalyst composition and prevents peeling of the catalyst, the adsorbent or the adsorbent-catalyst composition caused by a difference in the thermal expansion between the honeycomb structure and the catalyst, the adsorbent or the adsorbent-catalyst composition.

Next, description is made of an example of the process for producing a honeycomb structure of the present invention, particularly a metallic honeycomb structure.

First, for example, a Fe powder, an Al powder and a Cr powder, or alternatively powders of alloys of these metals are mixed to prepare a raw material metal powder mixture having a desired composition. Subsequently, the raw material metal powder mixture is mixed with an organic binder (e.g. methyl cellulose, polyvinyl alcohol) and water, and the resulting mixture is extrusion-molded to obtain a desired honeycomb form.

When the raw material metal powder mixture is mixed with an organic binder and water, an antioxidant (e.g. oleic acid) is preferably added to the raw material metal powder mixture prior to the addition of water. Alternatively, powder of metals subjected to an anti-oxidation process are preferably employed.

Next, the shaped honeycomb body is fired in a non-oxidizing atmosphere at a temperature ranging between 1,000 and 1,400° C. This firing is carried out in a non-oxidizing atmosphere containing hydrogen, because the organic binder is decomposed and thereby removed with the aid of Fe or the like which acts as a catalyst, and as a result a good sintered body can be obtained.

Firing at a temperature lower than 1,000° C. achieves no sintering. Sintering conducted at a temperature higher than 1,400° C. gives a deformed sintered body.

Preferably, the surfaces of the partition walls and pores of the thus obtained sintered body are coated with a heat-resistant metal oxide by any of the following methods.

(1) The metallic honeycomb structure (the sintered body) is subjected to a heat-treatment in an oxidizing atmosphere at a temperature ranging between 700 and 1,100° C.

(2) Al or the like is plated (e.g. vapor plating) on the surfaces of the partition walls and pores of the sintered body, and the resulting sintered body is subjected to a heat-treatment in an oxidizing atmosphere at a temperature ranging between 700 and 1,100° C.

(3) The sintered body is dipped into a molten metal (e.g. molten Al), and the resulting sintered body is subjected to a heat-treatment in an oxidizing atmosphere at a temperature ranging between 700 and 1,100° C.

(4) The surfaces of the partition walls and pores of the sintered body are coated with an alumina sol or the like, and the resulting sintered body is subjected to a heat-treatment in an oxidizing atmosphere at a temperature ranging between 700 and 1,100° C.

The above heat treatment is carried out preferably at a temperature between 900 and 1,100° C. in view of the heat resistance and oxidation resistance of the resulting honeycomb structure.

Next, the obtained metallic honeycomb structure is provided, between the electrodes to be described below, with a resistance-adjusting means of any form.

The resistance-adjusting means provided between the electrodes of the honeycomb structure may preferably take, for example, any of the following forms: (1) a slit or slits of any length, formed in any direction at any position, (2) variation in length or partition walls in the axial direction of passages, (3) variation in the thickness (wall thickness) of partition walls of the honeycomb structure or variation in the cell density of the honeycomb structure, and (4) a slit or slits formed in the partition wall (rib) of the honeycomb structure.

The metal honeycomb structure obtained in the manner described above is provided with electrodes, ordinarily on the outer periphery or inside by means of brazing, welding or the like, whereby a heater or a honeycomb heater of the present invention is produced.

Incidentally, the electrodes used herein refer to all types of terminals capable of applying a voltage to the heater, and include a terminal obtained by directly joining the outer periphery of a heater to its casing, an earth, etc.

The metallic honeycomb structure, when used as a heater, is preferably produced so as to have an overall resistance of 0.001–0.5Ω.

Whereas the honeycomb structure employed in the present invention may have any form, it is desirable that specifically the cell density is in the range of, for example, 6 to 1,500 cells/in$^2$ (0.9–233 cells/cm$^2$) with the wall thickness ranging from 50 to 2,000 μm.

As stated above, the honeycomb structure employed in the present invention may be porous or non-porous and may have any porosity. However, to achieve sufficient mechanical properties, oxidation resistance and corrosion resistance, the porosity of the metallic honeycomb structure is preferably held between 0 and 50% by volume with the most preferable porosity being less than 25% by volume. In a honeycomb structure having a catalyst, adsorbent or adsorbent-catalyst composition supported thereon, the porosity is preferably held at 5% or above to ensure strong adhesion between the honeycomb structure and the catalyst, adsorbent or adsorbent-catalyst composition.

The term "honeycomb structure" used herein refers to an integral body having a large number of passages partitioned by walls. The passages may have any cross-sectional shape (cell shape), for example, a circular, polygonal or corrugated shape.

The heater of the present invention can be produced by coating, on the honeycomb structure, the above-mentioned adsorbent composed mainly of zeolite or the above-mentioned adsorbent-catalyst composition comprising the adsorbent and a catalyst component supported thereon. The adsorbent or the adsorbent-catalyst composition is coated on the honeycomb structure in a film thickness of preferably 10–100 μm. When the film thickness is less than 10 μm, the resulting heater has insufficient durability. When the film thickness is more than 100 μm, the heater gives too large a pressure loss The coating of the adsorbent or the adsorbent-catalyst composition on the honeycomb structure can generally be carried out, for example, by coating a slurry of the adsorbent or adsorbent-catalyst composition on the honeycomb structure or dipping the honeycomb structure in the slurry. For example, a high-silica zeolite having a Si/Al ratio of not less than 40 is pulverized in a standard wet method, and a resultant slurry is coated onto the partition walls of a honeycomb structure. The slurry preferably includes a small amount (2–10 wt. %) of an inorganic binder, such as alumina sol and silica sol, so that a resultant coating adheres well to the surfaces of the honeycomb structure. The high-silica zeolite may be subjected to ion-exchange with at least one metal selected from a group consisted of Pt, Pd, Rh, Ir and Ru.

Processes for producing an adsorbent-catalyst composition are given below. As a first process, a honeycomb structure is coated with a slurry including a high-silica zeolite having a Si/Al ratio of not less than 40 and a heat-resistant inorganic oxide. The high-silica zeolite used in the slurry may be subjected to ion exchange in advance so as to load a noble metal selected from a group consisting of Pt, Pd, Rh, Ir and Ru onto the high-silica zeolite. Alternatively, the slurry may include a precursor for forming the heat-resistant oxide instead of the heat-resistant inorganic oxide itself. Then the slurry coated on the honeycomb structure is dried and/or fired. The honeycomb structure is impregnated with a solution containing at least one metal selected from Pt, Pd, Ir and Ru, followed by drying and/or firing the impregnated honeycomb structure. In this first process most of the impregnated metal is loaded onto the heat-resistant inorganic oxide because the high-silica zeolite is hydrophobic.

As a second process for producing an adsorbent catalyst composition, a honeycomb structure is coated with a slurry including: (i) a high-silica zeolite having a Si/Al ratio of not less than 40, or a high-silica zeolite having a Si/Al ratio of not less than 40 which is subjected to ion exchange in advance with at least one metal selected from Pt, Pd, Rh, Ir and Ru; and (ii) a heat-resistant inorganic oxide loaded with at least one metal selected from Pt, Pd, Rh, Ir and Ru, or a precursor for the heat-resistant oxide. Then the slurry coated on the honeycomb structure is dried and/or fired.

A third process for producing an adsorbent-catalyst composition includes the steps of: (1) coating a honeycomb structure with a slurry including a high-silica zeolite having a Si/Al ratio of not less than 40, or a zeolite precursor; (2) forming a first coating layer wherein the honeycomb structure after the first coating step is dried and/or fired, or is hydrothermally synthesized and dried and/or fired (optionally, the first coating layer is impregnated with a solution containing at least one metal selected from Pt, Pd, Rh, Ir and Ru so that the selected metal is loaded onto the high-silica zeolite); (3) coating the honeycomb structure with a slurry including a heat-resistant oxide or its precursor; and (4) forming a second coating layer wherein the honeycomb structure is dried and/or fired, and is then impregnated with a solution containing at least one metal selected from Pt, Pd, Rh, Ir and Ru, to allow said metal to be supported on the honeycomb structure, and then drying and/or firing the resulting catalyst.

A fourth process for producing an adsorbent-catalyst composition includes the steps of: (1) coating a honeycomb structure with a slurry including a high-silica zeolite having a Si/Al ratio of not less than 40, or a zeolite precursor; (2) forming a first coating layer wherein the honeycomb structure after the first coating step is dried and/or fired, or is hydrothermally synthesized and dried and/or fired (optionally, the first coating layer is impregnated with a solution containing at least one metal selected from Pt, Pd, Rh, Ir and Ru so that the selected metal is loaded onto the high-silica zeolite; (3) coating the honeycomb structure with a slurry including a heat-resistant oxide loaded with at least one metal selected from Pt, Pd, Rh, Ir, and Ru or precursor thereof and the honeycomb structure is dried and/or fired. The second coating step may be repeated several times to form several coating layers including the heat-resistant inorganic oxide. In this embodiment, the noble metal included in one coating layer may differ from a noble metal included in another coating layer.

In any of the four processes, a slurry including a zeolite may further include a small amount of an inorganic binder, such as alumina sol and silica sol, so that a resultant coating adheres better to the surfaces of the honeycomb structure. The high-silica zeolite and the heat-resistant oxide optionally include a rare earth oxide, such as $CeO_2$, $La_2O_3$, etc., and an alkaline earth metal. When a slurry for an adsorbent and an adsorbent-catalyst composition coated onto partition walls of a honeycomb structure is dried, the honeycomb structure may be heated at a temperature ranging from 80°

C. to 150° C. When the slurry coated onto partition walls of the honeycomb structure is fired, the honeycomb structure may be fired at a temperature ranging from 300° C. to 1,000° C.

As the main monolith catalyst used int the catalytic converter of the present invention, a conventional type may be used, but a three-way catalyst is preferable.

The zeolite adsorbent may employ any structure, for example, brads, pellets, a honeycomb structure or the like. But, a honeycomb structure is preferable in view of the pressure loss. In this case, the honeycomb structure itself may be composed mainly of zeolite; however, it is preferable that an adsorbent composed mainly of zeolite be loaded on a ceramic or metallic substrate which is heat-resistant and thermal shock resistant.

The present invention is hereinafter described in more detail by way of Examples. However, the present invention is in no way restricted to these Examples.

Zeolites used in the Examples are disclosed. These zeolites include mordenite zeolite A of H type, ZSM-5 zeolites B to E of H type, zeolite F that was obtained by immersing zeolite A into boiling hydrochloric acid so as to increase the Si/Al ratio, and ZSM-5 zeolite G of Na type. All of the zeolites A to G are commercially available. While zeolite G had an alkaline metal content of 0.85% by weight, the other zeolites had an alkaline metal content of up to 0.1% by weight. The Si/Al ratio of these zeolites are given in Table 1.

| Kind of Zeolite | Si/Al Atomic Ratio | Prior to Heat Treatment | BET Specific Surface Area (m²/g) according to Heat Treatment Temperature (° C.) | | |
|---|---|---|---|---|---|
| | | | 900 | 1,000 | 1,100 |
| A | 14 | 360 | 120 | 30 | <1 |
| B | 48 | 410 | 400 | 300 | 30 |
| C | 130 | 415 | 410 | 300 | 285 |
| D | 215 | 405 | 405 | 360 | 320 |
| E | 500 | 400 | 400 | 360 | 350 |
| F | 50 | 400 | 400 | 310 | 45 |
| G | 200 | 350 | 30 | 5 | <1 |

BET specific surface areas (m²/g) of these zeolites were measured at room temperature prior to heat treatment. After standing these zeolites in an electric furnace at 900° C., 1,000° C. and 1,100° C. for 5 hours, BET specific surface areas were measured again. These results are tabulated in Table 1.

As is clear from Table 1, the heat resistance of zeolite depends on its Si/Al ratio, and a zeolite having a Si/Al ratio not less than 40 maintains a sufficient specific surface area even at 1,000° C. When a zeolite is used in an exhaust system of an automobile, a maximum temperature to which the zeolite is exposed is about 1,000° C. Thus a specific surface area of a zeolite after its heat treatment at 1,000° C. is a criterion for its heat resistance in its application.

Zeolites A and B in powder form, which did not undergo heat treatment, were exposed at room temperature to a mixture of propane, propylene, and water. The ratio of propane to propylene is 2 to 1, and the mixture includes the water by 10%. An amount of propane and propylene adsorbed onto the zeolites were measured. Zeolite B adsorbed propane and propylene 1.5 times greater than did zeolite A. This result indicates that zeolite A is more prone to be poisoned by water than zeolite B.

EXAMPLE 1

A Fe powder, a Fe—Al powder (Al: 50 wt. %) and a Fe—Cr powder (Cr: 50 wt. %) having average particle sizes of 10, 20 and 22 µm, respectively, were mixed to prepare a mixture having a composition of Fe-22Cr-5Al (% by weight). To the mixture were added an organic binder (methyl cellulose), an antioxidant (oleic acid) and water to prepare a readily moldable body. The body was subjected to extrusion molding to obtain a honeycomb structure consisting of square cells having a rib thickness of 4 mil and passages of 400 cells/in² (cpi²). The honeycomb structure was dried and then fired in $H_2$ atmosphere at 1,300° C. Thereafter, the honeycomb structure was subjected to a heat treatment in air at 1,000° C. The resulting honeycomb structure had a porosity of 22% by volume and an average pore diameter of 5 µm.

Figure 2:
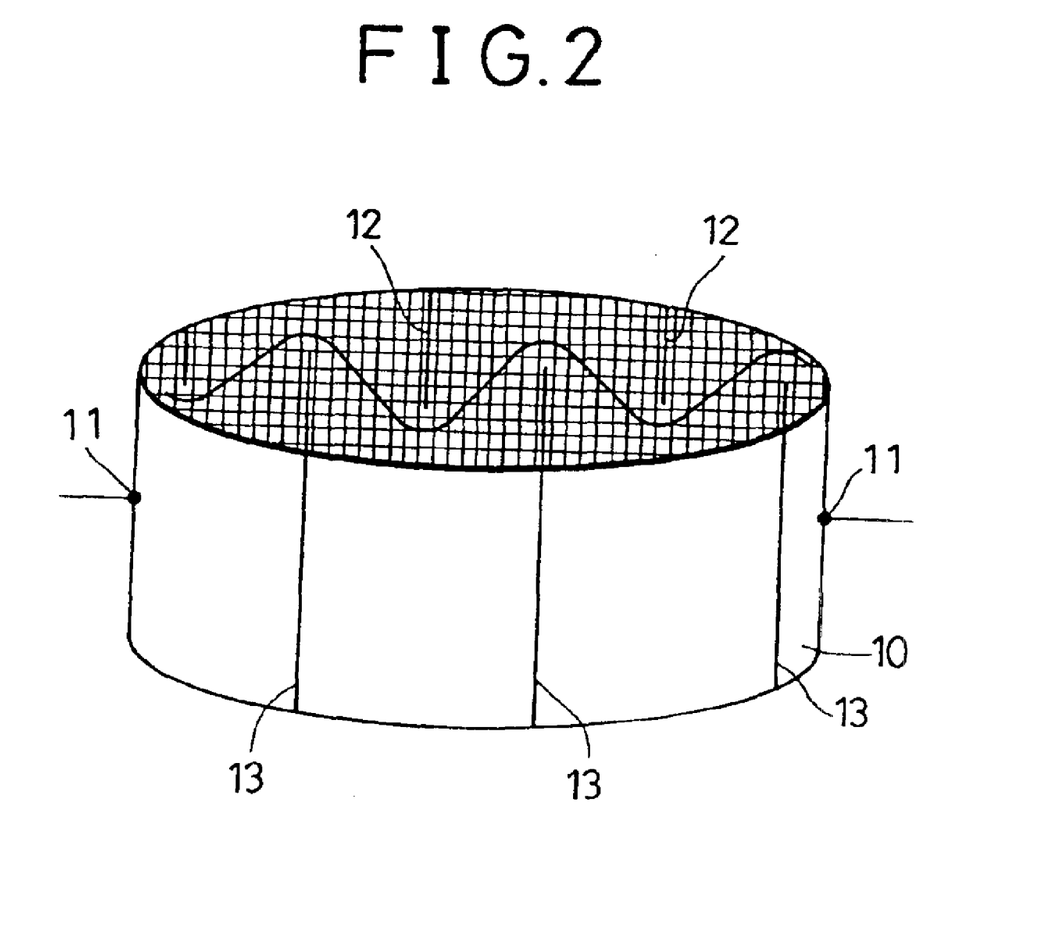
FIG. 2 illustrates an example of the honeycomb heater of the present invention.

On the above honeycomb structure having an outside diameter of 90 mmφ and a length of 50 mm was coated, in a thickness of 50 µm, a slurry obtained by mixing 95% by weight of H-ZSM-5 having a Si/Al ratio of 48 with 5% by weight of boehmite as a binder and then adding an appropriate amount of nitric acid. The resulting honeycomb structure was dried and fired to obtain a honeycomb structure coated with an adsorbent composed mainly of zeolite. Then, as shown in FIG. 2, two electrodes 11 were provided on the outer wall 10 of the honeycomb structure. Also, as shown in FIG. 2, six slits 12 having a length of 70 mm were formed in the honeycomb structure in the axial direction of the passages (the slits provided at the two ends had a length of 50 mm) at intervals of seven cells (about 10 mm). A zirconia type heat-resistant inorganic adhesive was filled in the outer peripheral portion 13 of each slit 12 to form an insulating portion. Thus, a heater of electrical heating type was produced.

The thus obtained heater was provided in front (upstream) of a commercially available three-way catalyst as a main monolith catalyst which was supported on a ceramic honeycomb structure consisting of square cells of 6 mil in rib thickness and 400 cells/in² in passage number, whereby a catalytic converter was produced.

The catalytic converter was evaluated as follows.

That is, in order to examine the performance at engine start-up, the catalytic converter was subjected to Bag 1 test by U.S. FTP, using an automobile of 2,400 cc displacement.

The heater was electrified at 12 V. The electrification was started after 10 seconds from engine start-up and stopped after 40 seconds from the start. During the electrification, control was made so that the gas temperature in the heater center became 400° C. Also, secondary air was fed into the catalytic converter at a rate of 200 liters/min for 50 seconds after engine start-up.

The results are shown in Table 1.

EXAMPLE 2

The same catalytic converter as in Example 1 was evaluated in the same manner as in Example 1 except that the electrification of the heater was started right after engine cranking. The results are shown in Table 2.

COMPARATIVE EXAMPLE 1

A catalytic converter consisting of only the same commercially available three-way catalyst as in Example 1 was evaluated in the same manner as in Example 1 except that no secondary air was introduced. The results are shown in Table 2.

COMPARATIVE EXAMPLE 2

The same catalytic converter as in Example 1 was evaluated in the same manner as in Example 1 except that no electrification of the heater was conducted. The results are shown in Table 2.

EXAMPLE 3

The zeolite adsorbent of Example 1 was replaced by a zeolite adsorbent-catalyst composition.

The zeolite adsorbent-catalyst composition was prepared as follows.

H-ZSM-5 (a zeolite having a Si/Al ratio of 48) was immersed in an aqueous solution containing $10^{-2}$ mol/liter of cationic platinum complex $[(NH_3)_4PtCl_2]$. The system was refluxed at 90° C. for 24 hours to conduct ion exchange. The resulting zeolite was water-washed five times under vacuum filtration, then dried at 100° C. for 16 hours, and fired at 550° C. for 3 hours to obtain a zeolite ion-exchanged with platinum.

There were mixed 40 parts of commercially available $\gamma$-$Al_2O_3$ (BET specific surface area: 200 m$^2$/g), 10 parts (in terms of $CeO_2$) of Cerium acetate and a $CeO_2$ powder, 50 parts of the above-obtained ion-exchanged zeolite and an appropriate amount of acetic acid, to form a slurry. This slurry was coated on the same honeycomb structure as in Example 1, in a thickness of 50 $\mu$m, followed by drying and firing. On the $\gamma$-$Al_2O_3$.$CeO_2$ of the resulting honeycomb structure were loaded Pt and Rh by impregnation, after which firing was conducted, to finally obtain adsorbent-catalyst composition composed mainly of zeolite and loading Pt and Rh at a ratio of 19/1 in an amount of 30 g/ft$^3$.

Using this adsorbent-catalyst composition, a catalytic converter wag produced in the same manner as in Example 1 and evaluated in the same manner as in Example 1. The results are shown in Table 2.

EXAMPLE 4

The same catalytic converter as in Example 3 was evaluated in the same manner as in Example 3 except that the electrification of the heater was started right after engine start-up. The results are shown in Table 2.

EXAMPLE 5

The evaluation of catalytic converter was effected in the same manner as in Example 4 except that the same adsorbent-catalyst composition as in Example 4 was provided downstream of the same commercially available three-way catalyst as in Example 4. The results are shown in Table 1.

COMPARATIVE EXAMPLE 3

The same catalytic converter as in Example 3 was evaluated in the same manner as in Example 3 except that no electrification of the heater was conducted. The results are shown in Table 2.

TABLE 2

|  | HC (g) | CO (g) | NO (g) |
| --- | --- | --- | --- |
| Example 1 | 1.35 (53) | 11.8 (55) | 2.01 (90) |
| Example 2 | 1.38 (54) | 12.0 (56) | 2.05 (92) |
| Comparative Example 1 | 2.56 (100) | 21.5 (100) | 2.23 (100) |

TABLE 2-continued

|  | HC (g) | CO (g) | NO (g) |
| --- | --- | --- | --- |
| Comparative Example 2 | 2.30 (90) | 20.4 (95) | 2.19 (98) |
| Example 3 | 1.02 (40) | 10.8 (50) | 1.87 (84) |
| Example 4 | 0.97 (38) | 10.0 (47) | 1.81 (81) |
| Example 5 | 1.10 (43) | 11.0 (51) | 1.83 (82) |
| Comparative Example 3 | 2.18 (85) | 19.4 (87) | 2.03. (90) |

Each of the figures in parentheses indicates a relative value of each exhaust gas when each value of Comparative Example 1 was taken as 100.

EXAMPLES 6–13

Comparative Examples 4–5

[Preparation of Honeycomb Heater]

A Fe powder, a Fe—Al powder (Al: 50 wt. %) and a Fe—Cr powder (Cr; 50 wt. %) having average particle sizes of 10, 20 and 22 $\mu$m, respectively, were mixed to prepare a mixture having a composition of Fe-22Cr-5Al (% by weight). To the mixture were added an organic binder (methyl cellulose), an antioxidant (oleic acid) and water to prepare a readily moldable body. The body was subjected to extrusion molding to obtain a honeycomb structure consisting of square cells having a rib thickness of 4 mil and passages of 400 cells/in$^2$ (cpi$^2$). The honeycomb structure was dried and then fired in $H_2$ atmosphere at 1,300° C. Thereafter, the honeycomb structure was subjected to a heat treatment in air at 1,000° C. The resulting honeycomb structure had a porosity of 22% by volume and an average pore diameter of 5 $\mu$m.

On the outer wall 10 of the above honeycomb structure having an outside diameter of 90 mm$\phi$ and a length of 50 mm were provided two electrodes 11, as shown in FIG. 2. Also, as shown in FIG. 2, six slits 12 having a length of 70 mm were formed in the honeycomb structure in the axial direction of the passages (the slits provided at the two ends had a length of 50 mm) at intervals of seven cells (about 10 mm). A zirconia type heat-resistant inorganic adhesive was filled in the outer peripheral portion 13 of each slit 12 to form an insulating portion. Thus, a honeycomb heater was produced.

[Loading of Catalyst A on Heater]

On the honeycomb heater was coated $\gamma$-$Al_2O_3$.$CeO_2$ (70:30 by weight). Then Pt and Rh were loaded in a total amount of 35 g/ft$^3$ at a ratio of Pt/Rh=5/1, after which firing was effected to load a catalyst A on the heater.

[Loading of Catalyst B on Heater]

On the same honeycomb heater was coated a mixture consisting of 50 parts of H-ZSM-5 (Si/Al ratio=48) ion-exchanged with Pt and 50 parts of $\gamma$-$Al_2O_3$.$CeO_2$ (80:20 by weight). Further, on the $\gamma$-$Al_2O_3$.$CeO_2$ were loaded Pt and Rh by impregnation to finally load Pt/Rh at a ratio of 19/1 in a total amount of 35 g/ft$^3$. The resultant honeycomb heater was fired at 600° C. to coat a catalyst B on the honeycomb heater in a film thickness of 50 $\mu$m.

[Zeolite Adsorbent]

H-ZSM-5 (Si/Al ratio=48) was coated, in a film thickness of 50 $\mu$m, on a commercially available cordierite honeycomb carrier of 25 mm in length (a honeycomb structure consisting of square cells of 6 mil in rib thickness and 400 cells/in$^2$ in passage number, a product of NGK INSULATORS, LTD.). Then, firing was effected at 600° C. to produce a zeolite adsorbent.

[Loading of Catalyst B on Zeolite Adsorbent]

The catalyst B was coated and loaded on the above-mentioned cordierite honeycomb carrier of 25 mm in length, in the same manner as in the above-mentioned loading of catalyst B on the heater.

[Loading of Catalyst C on Zeolite Adsorbent]

The above-mentioned cordierite honeycomb carrier was coated with a mixture of 50 parts of H-ZSM-5 having a Si/Al ratio of 48 and 50 parts of γ-$Al_2O_3$.$CeO_2$ (80:20 by weight). The honeycomb carrier was loaded with Pt and Rh having a molar ratio of 19 to 1 in a total amount of both metals of 35 g/$ft^3$. The resulting honeycomb carrier was fired at 600° C. to form catalyst C coated on the honeycomb carrier. The zeolite of catalyst C has a Si/Al ratio of 48 and is hydrophobic so that most of the platinum and rhodium metals are loaded onto γ-$Al_2O_3$.$CeO_2$.

[Loading of Catalyst D on Zeolite Adsorbent}

The above-mentioned cordierite honeycomb carrier was coated with H-ZSM-5 having a Si/Al ratio of 48 to form the first layer on the honeycomb carrier. The second layer consisting essentially of γ-$Al_2O_3$.$CeO_2$ (80:20 by weight) was formed on the first layer. An amount of H-ZSM-5 of the first layer is equal in terms of weight to an amount of γ-$Al_2O_3$.$CeO_2$ of the second layer. The second layer was loaded with Pt and Rh having a molar ratio of 19 to 1 in a total amount of both metals of 35 g/$ft^3$. The resulting honeycomb carrier was fired at 600° C. to form catalyst D coated on the honeycomb carrier. The layers of the catalyst D had a thickness of 50 μm.

[Loading of Zeolite Adsorbent on Heater]

The zeolite adsorbent was coated and loaded on the honeycomb heater, in the same manner as in the above-mentioned production of the zeolite adsorbent on the cordierite honeycomb carrier.

[Main Monolith Catalyst]

There was used a commercially available three-way catalyst whose carrier was a ceramic honeycomb structure consisting of square cells of 6 mil in rib thickness and 400 cells/$in^2$ in passage number.

The above honeycomb heaters, zeolite adsorbents and main monolith catalyst were arranged in the orders shown in Table 2 to assemble catalytic converters. The converters were evaluated as follows.

In order to examine the performance at engine start-up, the catalytic converter was subjected to Bag 1 test by the U.S. FTP, using an automobile of 2,400 cc displacement. The heater was electrified at 12 V. The electrification was started after 10 seconds from engine start-up and stopped after 40 seconds from the start. During the electrification, control was made so that the gas temperature in the heater center became 400° C. Also, secondary air was fed into the catalytic converter at a rate of 200 liters/min for 50 seconds after engine start-up.

The results are shown in Table 2.

For comparison, the same evaluation as above was made on the case wherein only the main monolith catalyst was used (Comparative Example 4), as well as on the case wherein the zeolite adsorbent and the main monolith catalyst were used but no honeycomb heater was used (Comparative Example 5). The results are shown in Table 2.

As is clear from Table 2, the catalytic converters of the present invention can well purify each exhaust gas component such as HC, CO, NO or the like.

| | Arrangement | | | | | | HC(g) | CO(g) | NO(g) |
|---|---|---|---|---|---|---|---|---|---|
| Example 6 | Zeolite adsorbent | → | Heater with no catalyst | | | → | Main monolith three-way catalyst | 1.41 (55) | 12.3 (57) | 2.01 (90) |
| Example 7 | Zeolite with catalyst B | → | Heater with no catalyst | | | → | Main monolith three-way catalyst | 1.33 (52) | 11.6 (54) | 1.94 (87) |
| Example 8 | Zeolite with catalyst B | → | Heater with catalyst A | | | → | Main monolith three-way catalyst | 1.02 (40) | 8.8 (41) | 1.78 (80) |
| Example 9 | Zeolite with catalyst B | → | Heater with catalyst B | | | → | Main monolith three-way catalyst | 0.99 (39) | 8.6 (40) | 1.74 (78) |
| Example 10 | Zeolite with catalyst B | → | Heater with catalyst B | | | → | Main monolith three-way catalyst | 1.05 (41) | 9.0 (42) | 1.85 (83) |
| Example 11 | Main monolith three-way catalyst | → | Zeolite with catalyst B | | | → | Heater with catalyst B | 1.10 (43) | 9.5 (44) | 1.90 (85) |
| Example 12 | Main monolith three-way catalyst | → | Zeolite with catalyst B | → | Heater with catalyst B | → | Main Monolith three-way catalyst | 1.10 (43) | 9.7 (45) | 1.74 (78) |
| Example 13 | Zeolite with catalyst B | → | Heater with zeolite adsorbent | | | → | Main monolith three-way catalyst | 1.23 (48) | 10.5 (49) | 1.85 (83) |
| Example 14 | Zeolite with catalyst C | → | Heater with catalyst A | | | → | Main monolith three-way catalyst | 1.05 (41) | 8.8 (41) | 1.76 (80) |
| Example 15 | Zeolite with catalyst D | → | Heater with catalyst A | | | → | Main monolith three-way catalyst | 1.00 (39) | 8.7 (40) | 1.78 (80) |
| Comparative Example 4 | Main monolith three-way catalyst (no air supply) | | | | | | | 2.56 (100) | 21.5 (100) | 2.23 (100) |
| Comparative Example 5 | Zeolite adsorbent | → | Main monolith three-way catalyst | | | | | 2.36 (92) | 20.6 (96) | 2.16 (97) |

Each of the figures in parentheses indicates a relative value of each exhaust gas when each value of Comparative Example 4 was taken as 100.

As stated above, in the present invention, the absorbability of zeolite and the heat-generatability of the heater can greatly improve the purification of exhaust gas components, particularly HC's and CO, whereby the amounts of these components discharged into the atmosphere can be reduced significantly.

Also, in the converter of the present invention, the zeolite adsorbent, the heater and the main monolith catalyst(s) can be arranged in the most appropriate order in view of the type of exhaust gas, the purpose of purification, the catalyst life, etc.

What is claimed is:

1. An absorbent structure comprising:
   a honeycomb structure having a periphery and two ends, including a plurality of passages that are defined by partition walls and extend in an axial direction between the ends; and
   a composition including (a) high-silica zeolite having a Si/Al atomic ratio of 48 to 215 and an alkali metal content of 0.08 to less than 0.1% by weight and (b) a heat-resistant oxide other than zeolite, wherein said high-silica zeolite in said adsorbent structure has a BET specific surface area after a heat treatment of 1,100° C. of 30 to 320 $m^2/g$, said heat-resistant oxide is loaded with a noble metal, and said composition is coated on the partition walls.

2. The adsorbent structure of claim 1, wherein the zeolite and the heat-resistant oxide loaded with a noble metal form a mixture.

3. The adsorbent structure of claim 2, wherein the zeolite is loaded with a noble metal.

4. The adsorbent structure of claim 1, wherein said zeolite is loaded with a noble metal.

5. The adsorbent structure of claim 1, wherein said heat resistant oxide comprises a material selected from the group consisting of $Al_2O_3$, $TiO_2$, $ZrO_2$ or $SiO_2$.

6. The adsorbent structure of claim 1, wherein the ratio of (a) to (b) ranges from 10:90 to 85:15.

7. The adsorbent structure of claim 1, wherein said high-silica zeolite in said adsorbent structure is an H type zeolite.

* * * * *